United States Patent [19]

Kitanishi

[11] Patent Number: 4,800,584
[45] Date of Patent: Jan. 24, 1989

[54] INDEX DEVICE FOR AUTOMATIC INFORMATION RETRIEVAL

[75] Inventor: Ryoji Kitanishi, Tokyo, Japan

[73] Assignee: Tandy Electronics Japan, Ltd., Tokyo, Japan

[21] Appl. No.: 92,551

[22] Filed: Sep. 3, 1987

[30] Foreign Application Priority Data

Sep. 19, 1986 [JP] Japan .......................... 61-143731[U]

[51] Int. Cl.⁴ ............................................. H04M 1/27
[52] U.S. Cl. ...................................... 379/355; 40/371
[58] Field of Search ...................... 379/354, 355, 357; 340/365 VL, 365 R; 40/371, 372

[56] References Cited

U.S. PATENT DOCUMENTS

| | | | |
|---|---|---|---|
| 4,277,651 | 7/1981 | Fisher, II et al. | 379/354 X |
| 4,278,845 | 7/1981 | Chiou | 379/354 X |
| 4,408,101 | 10/1983 | Brodbeck | 379/357 |
| 4,409,440 | 10/1983 | Brodbeck | 379/357 |
| 4,595,798 | 6/1986 | Brodbeck | 379/357 |
| 4,661,976 | 4/1987 | Busch | 379/354 |

Primary Examiner—James L. Dwyer
Attorney, Agent, or Firm—Wolf, Greenfield & Sacks

[57] ABSTRACT

An indexing device for providing signals identifying the address in a memory device of stored information corresponding to any selected listing in the index has a housing in which is stacked a quantity of index cards of the type enabling a plurality of listings to be entered on each card. The housing can be closed by a hinged cover which carries an indicator that can be moved to line up with card identifying indicia marked on the cover. The indicator is pivotally mounted on a carriage that is slidably mounted at one edge of the cover. Disposed in the housing along the path of travel of the slidable indicator is a position sensor which detects the position of the indicator at stations which are disposed along the indicator's travel path to match the alignment of the indicator with the card identifying indicia on the cover. Coupled to the position sensor is a signal generator which, when the cover is unlatched, emits a "card" signal that is part of the address at which the related information is stored in the memory device. Pivoting of the indicator on the carriage causes the position sensor to sense the position of the indicator and substantially simultaneously unlatches the cover.

2 Claims, 4 Drawing Sheets

INDEX DEVICE FOR AUTOMATIC INFORMATION RETRIEVAL

FIELD OF THE INVENTION

This invention relates in general to the automatic dialing out of telephone numbers. More particularly, the invention pertains to indexing mechanisms for use with repertory dialers which are capable of accommodating a large repertoire requiring the listing in the index of the many items in the repertoire. In particular, the invention concerns an indexer for an automatic telephone dialer in which the number to be automatically dialed is singled out by designating one of the many items listed in the index through the positioning of a slidable indicator followed by the actuation of one or more selector keys.

BACKGROUND OF THE INVENTION

An indexing device for selecting a telephone number that is to be automatically dialed out is disclosed in Japanese Patent Application No. 214997 which was published in 1985. That publication describes a purely mechanical indexer combined with an electronic arrangement for retrieving the selected telephone number. That mechanical indexer employs a housing having in it a quantity of index cards stacked one atop another. The housing has a hinged cover which flips open upon activation of an unlatching bar. A slidable indicator is attached to the cover and, in the conventional manner of such indexers, is movable to line up with alphabetic symbols on the cover. For example, to find a listing for someone whose name begins with an M, the cover is closed and the indicator is moved to line up with the letter M on the cover. When the cover flips open, the indicator lifts all the cards overlying the index card for the letter M so that the M index card and the listings on it can then be seen. As is customary, each index card has lines (or spaces) on which names or other identifying information can be listed. Stored in an electronic memory in the indexer are telephone number data pertaining to each listing on the index cards. The stored data corresponding to a selected listing is read out (i.e. retrieved) by an electronic retrieval arrangement employing a detector which generates a "card" signal that identifies the chosen card by detecting the position of the slidable indicator. The retrieval arrangement, in addition, has a selector keying arrangement by which a particular listing on the card is selected. Upon actuation of a selected key, a "line" signal is generated which in conjunction with the "card" signal designates the address in the memory at which the corresponding telephone number is stored. To dial out the telephone number corresponding to the selected listing, the information stored at the designated address is read out from the memory.

An improvement upon the indexer described in the cited Japanese publication is disclosed in U.S. patent application Ser. No. 35,896, filed Apr. 6, 1987 now abandoned. In that improvement, apparatus for detecting the position of the slidable indicator is situated below the cards at one edge of the cover. The slider carries a pressure member that rides upon and resiliently presses down upon a thin insulative strip having an electrically conductive film coated upon its lower surface. When the slider is lined up with an alphabetic symbol on the cover, the pressure member forces the film on the strip to electrically contact a pad disposed on a substrate situated below the stack of index cards. The insulative strip must have sufficient restoring force to break the electrical contact immediately after the passage of the pressure member. Consequently, it is necessary to employ a material for the insulative strip that has a strong restoring force and which is able to endure the wear imposed upon it by the riding upon its upper surface of the pressure member. An insulative strip having a weak restoring force can enable the conductive film to to remain in contact with the pad after the pressure member has passed by and thereby cause the generation of false positional signals that may be confused with the true positional signals. That need for a wear resistant insulative strip whose strong restoring force is not impaired with usage nor diminished as the strip ages with the passage of time is one of the principal problems associated with this type of index device.

In addition to that problem, indexing devices of this type conventionally have a separate latch release button for opening the cover. In that conventional arrangement, the slider, with the cover latched down, is moved to line up with the appropriate symbol on the cover and the cover is then flipped open by actuation of the release button. Consequently, two separate and distinct steps are required with this conventional arrangement.

OBJECTS OF THE INVENTION

The principal object of the invention is to provide an indexing device of the kind described above for automatically dialing out telephone numbers but which utilizes an indicator position detection arrangement that avoids the problem of continual wear caused by the riding of the pressure member on the upper surface of the insulative strip when the slider is moved.

Another object of the invention is to provide an indexing device of the kind described above for automatically dialing out telephone numbers but which utilizes an indicator position detection arrangement that prevents the generation of false positional signals caused by an insulative strip having a weak restoring force.

A further object of the invention is to provide and indexing device of the kind described above for automatically dialing out telephone numbers but which combines the cover unlatching button with the slidable indicator in a manner such that sensing of the position of the indicator and unlatching of the cover are performed in response to a one step actuation of the indicator.

SUMMARY OF THE INVENTION

The invention resides in an indexing device having a housing in which a quantity of index cards are stacked one atop another. A hinged cover is attached to the housing in a manner enabling the cover to flip open when unlatched to expose a selected index card. Slidably mounted on the cover is a carriage on which is pivotally mounted an indicator which can be made to line up with alphabetic indicia marked on the cover by moving the carriage. With the cover latched in its close position, the carriage is able to move along a channel in the housing which extends alongside on edge of the stack of index cards. Disposed in the housing at the bottom of the channel is a position sensor for detecting the position of the indicator. To aid in the detection of the indicator s position, the indicator carries a cylindrical depressor which is disposed over and is spaced from an insulative strip having an electrically conductive film attached to its underside. That strip extends along the channel and as the indicator moves along the channel, the depressor moves above the upper surface of the insulative strip. The position detector has an insulative lower strip situated under the conductive film carried by the upper insulative strip. The lower strip has a number of holes spaced along the channel with the position of the holes being related to the position of the alphabetic indicia on the cover. Disposed under the lower strip is a substrate having conductive pads directly beneath the holes in that lower strip. With the depressor disposed over a hole in the insulative lower strip, the indicator is pivoted about its carrier and causes the cylindrical depressor to press the conductive film into contact with the pad beneath the hole. The conductive film is connected to a source of voltage and when that film is pressed into contact with a pad on the substrate an electrical current is caused to flow. A position signal generator is connected to the pads and is able to ascertain the position of the indicator by detecting which of the pads is conducting electrical current. When the indicator is pivoted, the cover is unlatched and flips open, causing a "cover release" signal to be generated which causes the position signal generator to emit a "card" signal identifying the position of the indicator. The "card" signal is part of an address in a memory device at which information is stored related to a listing on an index card. The remainder of that address (i.e., the "line" signal), is generated in a conventional manner by actuation of one or two selector keys.

THE DRAWINGS

Figure 8:
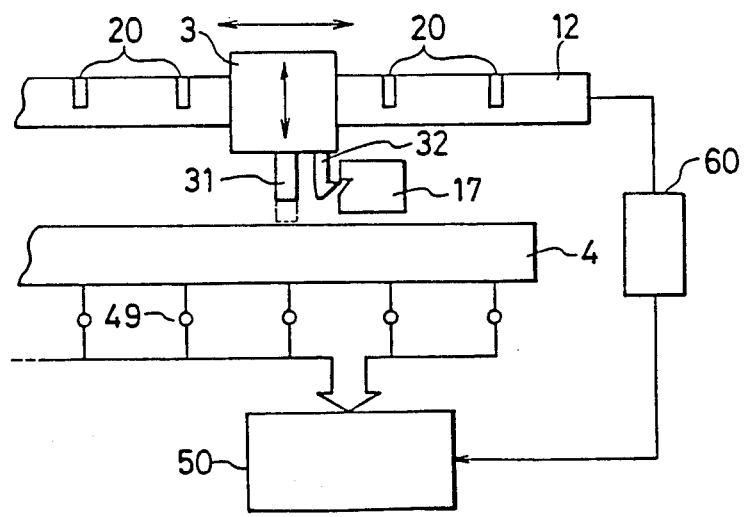

FIG. 8 schematically depicts the preferred arrangement for generating a signal identifying the station at which the indicator is positioned at the time the cover is released from its latched position.

DETAILED DESCRIPTION OF THE PREFERRED EMBODIMENT

Figure 1:
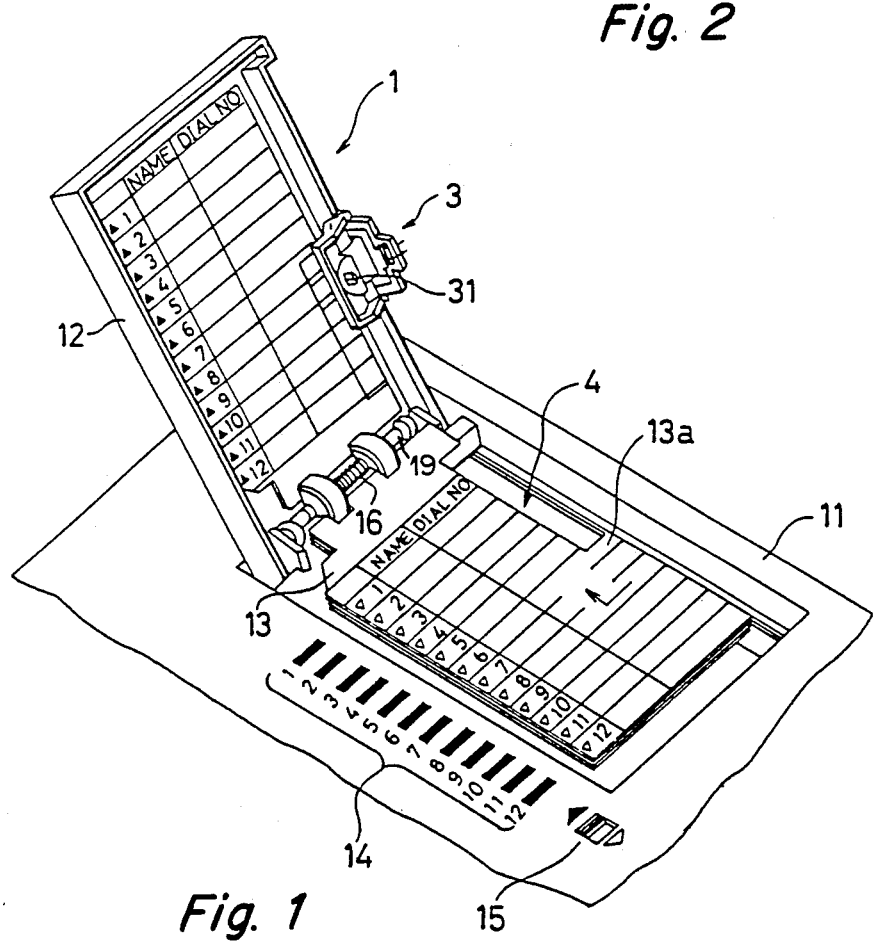
FIG. 1 is a perspective view of the preferred embodiment of the invention with the cover in its open position.

Referring now to the perspective view of the preferred embodiment shown in FIG. 1, the housing has a well in which is situated a stack of index cards 13. Disposed in the well below the index cards is a position sensor mechanism 4 for detecting the position of a movable indicator mounted on a slidable carriage. In this embodiment, the base structure 11 may contain a telephone keypad having an attached telephone handset arranged in the manner that is conventional with apparatus of this kind.

As viewed in FIG. 1, each card at its right edge has a cut-out whose extent is governed by the alphabetic characters associated with the card. A channel at the right edge of the well accommodates a carriage 3 that is mounted in a manner enabling the carriage to slide along the hinged cover 12. Pivotally mounted of the carriage is an indicator which can be lined up with indicia on the cover by moving the carriage. With the cover latched in its closed position, the carriage is able to slide along the channel in the housing. The carriage carries a shelf 3a (FIG. 4) which extends underneath the protruding right edges of the index cards. Upon pivotal rotation of the indicator, the cover is released and is flipped open by a spring 16 coiled around the shaft 19. Upon opening of the cover, the shelf lifts those cards whose right edges overlay the shelf.

Figure 2:
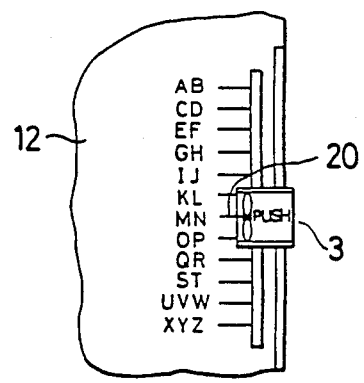
FIG. 2 shows the arrangement of alphabetic indicia on the cover of the indexing device.

FIG. 2 depicts a portion of the outer surface of the cover 12 on which is marked a column of alphabetic characters from A to Z. The 26 letters of the alphabet, in this instance, are divided into twelve groups. That grouping reduces the number of index cards that would otherwise be required if each alphabetic character had its own index card. The location of each group in the column corresponds to an index position of the indicator when the indicator is aligned with the group marking When the indicator is aligned with a group marking, upon unlatching of the cover, the indicator carries up with it all the index cards overlying the index card for that group. For example, where the indicator is aligned with MN group mark 20, as depicted in FIG. 2, upon the opening of the cover, all the cards overlying the MN index card are carried up by the indicator so that the MN index card becomes the top card of the stack remaining in the housing. The flipping open of the cover exposes the reverse side of the bottom index card carried up by the indicator. Consequently, opening of the cover, exposes two index cards; an upper card, in the cover and a lower card 13a in the housing. The upper card, as shown in FIG. 1, has twelve lines designated 1 to 12 for twelve more entries. Each of the lines has space to enter a name, a phone number, or other identifying information. A memory device in the indexer or in the associated telephone is arranged to electronically store data corresponding to the telephone number of each entry at an address in the memory matched to the position in the index of the entry. That stored information is accessed by a "card" signal and a "line" signal generated by the indexing apparatus. For the generation of the "line" signal, the housing is provided with a column of twelve keys 14 matching in number the twelve entry lines on an index card and a two position key 15 which is placed in one position when the selected listing is on the upper index card and is placed in the other position when the selected listing is on the lower index card.

To generate the "card" signal, the indexing apparatus has a position sensor in the housing for detecting the position of the slidably mounted indicator.

Figure 3:
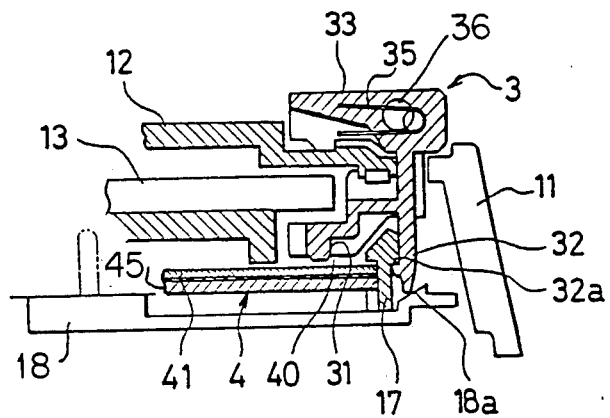
FIG. 3 is a fragmentary cross-sectional view of the preferred embodiment of the invention showing the sliding mechanism with the cover latched down and the indicator in its unrotated state.

A cross-sectional view of the slidable carriage and the underlying position sensor is shown in FIG. 3. In that cross-sectional view, a cylindrical depressor 31 is shown which is carried by the indicator 33. The indicator 33 is mounted on the carriage 3 to pivot about an axle 36. A spring 35 is arranged to bias the indicator to the position shown in FIG. 3. In that position, a latch bar 32 carried by the indicator 33 engages a retainer 17 and holds the cover 12 latched down. The retainer 17 is part of the lower body 18 of the indexing device and extends, as shown in FIG. 3, upwardly into the well of the device. The depressor 31 is disposed over and spaced by a gap 40 from an underlying electrically insulative strip 41 having a conductive film 42 coated on its under side. The strip 40 and its conductive film are elements of a position sensor for detecting the position of indicator 33.

Figure 4:
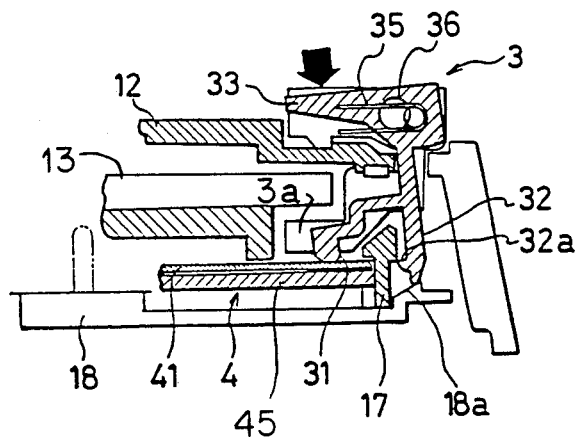
FIG. 4 is a fragmentary cross-sectional view of the preferred embodiment of the invention showing the sliding mechanism with the cover in the down position just before unlatching of the cover by rotation of the indicator.
Figure 7:
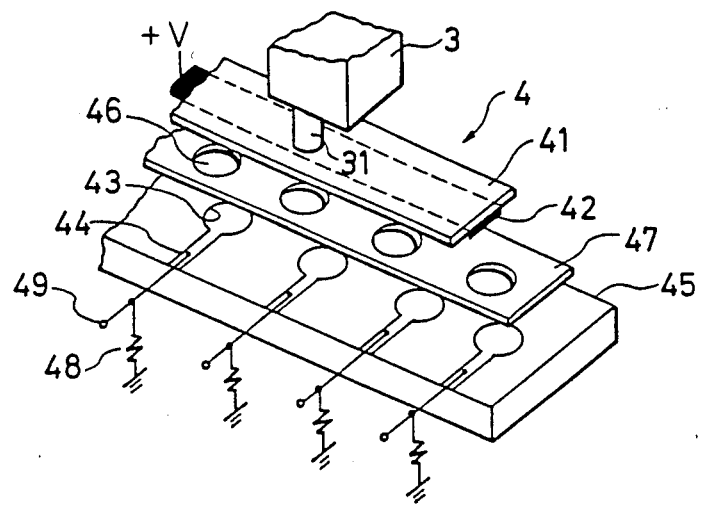
FIG. 7 is an exploded view, in perspective, schematically showing the preferred arrangement of apparatus for sensing the position of the movable indicator.

The position sensor is schematically depicted in FIG. 7 where a portion of the insulative strip 41 and its electrically conductive film 42 are shown extending lengthwise over an electrically insulative substrate 45 having electrically conductive pads 43 spaced apart on the substrate's upper surface. Disposed between the insulative strip 41 and the substrate 45 is an insulative spacer strip 47 having circular holes 48 which are situated directly over and in alignment with the pads 43 on the substrate. Disposed over the upper insulative strip is the depressor 31 which is carried by the indicator 33. The holes in spacer strip 47 are situated so that the depressor 31 is disposed above a hole when the indicator 33 is lined up with a group marking on the cover. Thus, the positions of the holes and of the pads on the substrate are related to the group markings on the cover. The electrically conductive film 42 which is secured to the underside of insulator strip 41 may be a thin sheet or flexible foil of aluminum or copper. That electrically conductive film is electrically energized by a source of electrical energy, as indicated by the +V symbol in FIG. 7. When the cylindrical depressor 31 is situated over a hole in the spacer strip, rotation of indicator 33 about its axle 36 as depicted in FIG. 4, by a force exerted in the direction of the arrow, causes depressor 31 to move downward and press the conductive film into contact with the underlying pad on the substrate.

As shown in FIG. 7, each conductive pad has a conductive path 44 extending to the edge of the substrate where the path is connected to ground through its own resistor 48. The voltage drop across the resistor caused by the flow of electric current is sensed through a connection to terminal 49.

Referring now to FIG. 8 which schematically depicts the arrangement for detecting the position of the indicator 33, that indicator is shown as being movable along the cover 12. The position of the group markings on the cover are represented by the notches 20. In FIG. 8 the cover is shown held in the down position by the latch bar 32 which is in engagement with the retainer 17. In that condition of the indexing device, depressor 31 is disposed above and spaced from insulative strip 41 by gap 40. The sensor block 4 of FIG. 8 schematically represents the position detection assemblage shown in FIG. 7. The terminals 49 of the position sensor are electrically connected to a position detector circuit 50. The position detector circuit is triggered by a signal from a release detector 60 which, upon detecting the unlatching of the cover, emits a signal to the position detector 50.

Figure 5:
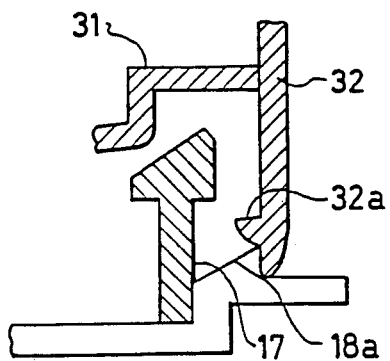
FIG. 5 is a cross-sectional view of a portion of the latching mechanism employed in the preferred embodiment of the invention.

With the cover latched in the down position, the carriage 3 is moved to line up indicator 33 with one of the group markings on the cover. When so aligned, the depressor 31 is disposed over and spaced from the insulator strip 41 with the depressor in substantial alignment with one of the holes in the spacer strip. When the indicator is rotated, the depressor moves down and presses the conductive film 42 into contact with the underlying pad 43 on the substrate 45. Position detector 50 detects which one of the terminals 49 is at the +V voltage and is able to thereby determine which of the index cards has been selected. When the latch bar 32 releases the cover 12, release detector 60 emits a signal to position detector 50 which thereupon generates a "card" signal. The function of the position detector may, for example, be performed by a microcomputer which receives its inputs from terminals 49 of the position sensor. The release detector 60 may be a switch that is mechanically operated by actuation of the latch bar 32. Upon the emission of a "cover release" signal by detector 60, the microcomputer scans terminals 49 to check the voltage level at those terminals. In this way, the microcomputer ascertains the position of indicator 33 and emits the proper card" signal. When the "card" signal is combined with the "line" signal generated by the microcomputer from input signals supplied by the keys 14 and 15, the "card" signal and the "line" signal then constitute an address at which the related telephone number data is stored in the memory device. The data stored at that address is read out and the telephone number corresponding to the selected listing in the index is automatically dialed out Referring now to FIG. 4, the indicator 33 is shown in the position just prior to unlatching of the cover 12. Pressure applied to the indicator in the direction of the arrow causes the indicator to rotate about the axle 36 against the force of the spring 35. Rotation of the indicator from its initial position depicted in FIG. 3 to the position depicted in FIG. 4 causes the lower end of latch bar 32 to move along the ramp 18a of the lower body 18. The rotation of indicator 33 swings depressor 31 downward close to insulator strip 41 while the cover is still held down by the engagement of lip 32a of latch bar 32 with the retainer 17. At the instant of disengagement of the latch, the lower end of latch bar 32 slips over the end of the ramp and, as shown in FIG. 5, the latch bar moves down and comes to rest on the lower body 18 of the device. The downward movement of the latch bar causes depressor 31 to move down and press the conductive film 42 on the underside of strip 41 into contact with the underlying pad on the substrate. Substantially simultaneously with the making of that electrical contact, release detector 60 (FIG. 8) emits a signal to position detector 50 which thereupon ascertains the position of indicator 33 from the signals present at terminals 49.

Figure 6:
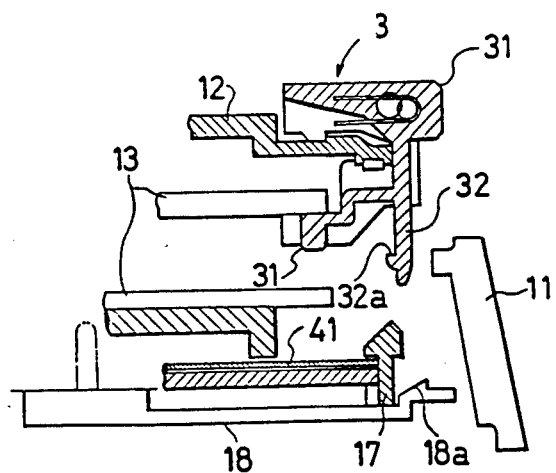
FIG. 6 is a fragmentary cross-sectional view of the preferred embodiment of the invention showing the sliding mechanism lifting the index cards after unlatching of the cover.

Upon release of pressure on the indicator 33, the unlatched cover swings upwardly, as depicted in FIG. 6, and carries with it those index cards overlying the shelf 3a (FIG. 4) of the slidable assemblage.

Obvious modifications of the invention will be evident to those persons skilled in telephone technology or in electronics. For example, the indicator position sensor here disclosed can be modified to employ a light emitting element on the indicator and light detectors (such as photo diodes) on the circuit board in place of the conductive pads. As another example, the indicator may carry a magnet, the strip 48 may be on a material that allows the magnetic flux of the magnet to extend only through the holes in that strip, and magnetic sensors may be disposed under the holes in place of the conductive pad.

In view of the modifications of the invention that are obvious to those persons skilled in telephony or in electronics, it is not intended that the invention be restricted to the preferred embodiment herein disclosed. Rather, it is intended that the invention be construed in accordance with the accompanying claims, having due regard for modifications that merely involve the substitution of equivalents or other obvious changes.

What is claimed is:

1. An indexing device for providing signals identifying the address in a memory device of stored information corresponding to any selected index entry, comprising
   (a) a housing having a plurality of index cards therein,
   (b) A movable cover having a closed position in which it covers the index cards in the housing,
   (c) a carriage movably mounted on the cover,
   (d) an indicator pivotally mounted on the carriage and arranged to be selectively brought into alignment with indicia on the cover by movement of the carriage,
   (e) a position sensor disposed in the housing and extending along the path of movement of the carriage for detecting the position of the indicator,
   (f) means carried by the indicator for enabling the position sensor to detect the position of the indicator at stations along the indicator's path of movement,
   (g) signal generating means coupled to the position sensor for generating a signal identifying the station at which the indicator is positioned,
   (h) latch means carried by the pivoted indicator for latching the cover in its closed position, and
   (i) a latch retainer disposed in and secured to the housing and situated to engage the latch means carried by the pivoted indicator.

2. The indexing device according to claim 1, wherein the position sensor comprises
   (1) an electrically insulative upper strip having an electrically conductive film on its underside,
   (2) a substrate disposed beneath the upper strip, the substrate having electrically conductive pads spaced along its upper surface at stations corresponding to the indicia on the cover,
   (3) an electrically insulative lower strip disposed between the upper strip and the substrate, the lower strip having holes therein aligned with the pads on the substrate, and wherein the means carried by the indicator for enabling the position sensor to detect the position of the indicator at stations along the indicator s path of movement includes a depressor for pressing the conductive film of the upper strip into contact with the pads on the substrate and a latch bar ed to permit activation of the depressor.

* * * * *